(12) United States Patent
Aliaga et al.

(10) Patent No.: US 7,126,603 B2
(45) Date of Patent: Oct. 24, 2006

(54) METHOD AND SYSTEM FOR CREATING INTERACTIVE WALKTHROUGHS OF REAL-WORLD ENVIRONMENT FROM SET OF DENSELY CAPTURED IMAGES

(75) Inventors: Daniel G. Aliaga, Millington, NJ (US); Ingrid Birgitta Carlbom, Summit, NJ (US); Thomas A. Funkhouser, Pennington, NJ (US); Dimah V. Yanovsky, Plainsboro, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 328 days.

(21) Appl. No.: 10/452,020

(22) Filed: May 30, 2003

(65) Prior Publication Data

US 2004/0240741 A1 Dec. 2, 2004

(51) Int. Cl.
*G06T 15/10* (2006.01)
*G06K 9/36* (2006.01)

(52) U.S. Cl. ...................... 345/427; 382/240
(58) Field of Classification Search ................ 345/427, 345/428; 382/240
See application file for complete search history.

(56) References Cited

U.S. PATENT DOCUMENTS

| 6,097,394 A | 8/2000 | Levoy et al. |
| 6,118,474 A | 9/2000 | Nayar |
| 6,674,911 B1 * | 1/2004 | Pearlman et al. ........... 382/240 |
| 6,724,384 B1 * | 4/2004 | Weingarten ................. 345/426 |

OTHER PUBLICATIONS

Gaurav Agarwal, Dinesh Rathi, Prem Kalra and Subhashis Banerjee, "A System for Image Based Rendering of Walk-Throughs," Jul. 2002, Computer Graphics International.*

David Gotz, Ketan Mayer-Patel, Dinesh Manocha, "IRW: An Incremental Representation of Image Based Walkthroughts," Dec. 2002, In Proceedings of the ACM International Conference on Multimedia 2002, pp. 67-76.*

Hugues Hoppe, "Efficient Implementation of Progressive Meshes," Jan. 1998, Microsoft Technical Report MSR-TR-98-0x2.*

Jonathan Shade, Dani Lischinski, David H. Salesin, Tony DeRose, John Snyder, "Hierarchical Image Caching for Accelerated Walkthroughs of Complex Environments," Jan. 1996, University of Washington Technical Report UW-CSE-96-01-06.*

Camillo J. Taylor, "VideoPlus," Jun. 2000, IEEE Workshop on Omnidirectional Vision.*

(Continued)

*Primary Examiner*—Ulka Chauhan
*Assistant Examiner*—Jason M. Repko

(57) ABSTRACT

Techniques for creating interactive walkthroughs or visualizations of real-world environments. Such environments for which interactive walkthroughs may be created may comprise large interior spaces (e.g., buildings), wherein a space may comprise multiple rooms. The interactive walkthroughs may be photorealistic and rendered from arbitrary viewpoints at interactive rates. In one aspect of the invention, a technique for generating a visualization representative of an environment comprises the following steps. A dense set of image data is captured from the environment. The captured image data is compressed for storage. A portion of the compressed image data may then be decompressed so as to render a visualization representative of the environment from a selected novel viewpoint. Another portion of the image data may be prefetched and decompressed such that captured image data surrounding the selected novel viewpoint is available to be rendered. The visualization of the environment may then be rendered from the selected novel viewpoint.

18 Claims, 4 Drawing Sheets

OTHER PUBLICATIONS

Andrew Wilson, Dinesh Manocha, and Ketan Mayer-Patel, "Spatially-encoded far-field representations for interactive walkthroughs," Sep. 2001, In Proceedings of ACM Multimedia Conference, pp. 348-357.*

Daniel G. Aliaga, Ingrid Carlbom, "Plenoptic Stitching: A Scalable Method for Reconstructing 3D Interactive Walkthroughs," Aug. 12, 2001, Proceedings of the 28th annual conference on Computer graphics and interactive techniques, p. 443-450.*

Marcus Magnor and Bernd Girod, "Data Compression for Light-Field Rendering," Apr. 2000, IEEE Transactions on Circuits and Systems for Video Technology, vol. 10, No. 3.*

Wilson et al, "Spatially-encoded far-field representations for interactive walkthroughs," Sep. 2001, In Proceedings of ACM Multimedia Conference, pp. 348-356.*

Jonathan Shade, Dani Lischinski, David H. Salesin, Tony DeRose, John Snyder, "Hierarchical image caching for accelerated walkthroughs of complex environments," Jan. 1996, Technical Report UW-CSE-96-01-06.*

Gaurav Agarwal, Dinesh Rathi, Prem Kalra and Subhashis Banerjee, "A System for Image Based Rendering of Walk-Throughs," Jul. 1, 2002, Proceedings of Computer Graphics International.*

David Gotz, Ketan Mayer-Patel, Dinesh Manocha, "IRW: An Incremental Representation of Image Based Walkthroughs," Dec. 2002, In Proceedings of the ACM International Conference on Multimedia 2002, p. 67-76.*

Hugues Hoppe, "Efficient Implementation of Progressive Meshes," Jan. 1998, Microsoft Technical Report MSR-TR-98-0x2.*

Jonathan Shade, Dani Lischinski, David H. Salesin, Tony DeRose, John Snyder, "Hierarchical Image Caching for Accelerated Walkthroughs of Complex Environments," Jan. 1996, University of Washington Technical Report UW-CSE-96-01-06.*

Camillo J. Taylor, "VideoPlus," Jun. 2000, IEEE Workshop on Omnidirectional Vision, p. 3-11.*

Andrew Wilson, Dinesh Manocha, and Ketan Mayer-Patel, "Spatially-encoded far-field representations for interactive walkthroughs," Sep. 2001, In Proceedings of ACM Multimedia Conference, p. 348-357.*

Marcus Magnor and Bernd Girod, "Data Compression for Light-Field Rendering," Apr. 2000, IEEE Transactions on Circuits and Systems for Video Technology, vol. 10, No. 3, p. 338-343.*

U.S. Appl. No. 10/452,314, filed May 30, 2003, "Method and Apparatus for Compressing and Decompressing Images Captured from Viewpoints Throughout N-Dimensional Space".

U.S. Appl. No. 10/452,019, filed May 30, 2003, "Method and Apparatus for Finding Feature Correspondences Between Images Captured in Real-World Environments".

U.S. Appl. No. 10/449,929, filed May 30, 2003, "Method and Apparatus for Computing Error-Bounded Position and Orientation of Panoramic Cameras in Real-World Environments".

U.S. Appl. No. 10/156,189, filed Jun. 29, 2002, "Camera Model and Calibration Procedure for Omnidirectional Paraboloidal Catadioptric Cameras".

U.S. Appl. No. 10/122,337, filed Apr. 16, 2002, "Method and System for Reconstructing 3D Interactive Walkthroughs of Real-World Environments".

Shree K. Nayar, "Catadioptric Omnidirectional Camera," IEEE Computer Vision and Pattern Recognition (CVPR '97), 7 pages, 1997.

Henry Fuchs, "On Visible Surface Generation by a Priori Tree Structures," Computer Graphics, Proceedings of SIGGRAPH '890, pp. 124-133, 1980.

B. Triggs et al., "Bundle Adjustment—A Modern Synthesis," Vision Algorithms: Theory and Practice, Springer-Verlag, pp. 1-71, 2000.

J. Shi et al., "Good Features to Track," Proceedings of IEEE on Computer Vision and Pattern Recognition (CVPR94), Seattle, 8 pages, Jun. 1994.

E.H. Adelson et al., "The Plenoptic Function and the Elements of Early Vision," Computational Models of Visual Processing, MIT Press, pp. 1-20, 1991.

M. Levoy et al., "Light Field Rendering," Proceedings of ACM SIGGRAPH 96, pp. 1-12, 1996.

S. Teller et al., "Calibrated, Registered Images of an Extended Urban Area," IEEE Computer Vision and Pattern Recognition (CVPR), pp. 1-20, 2001.

R. Koch et al., "Calibration of Hand-held Camera Sequences for Plenoptic Modeling," IEEE International Conference on Computer Vision (ICCV), 7 pages, 1999.

Camillo J. Taylor, "VideoPlus," IEEE Workshop on Omindirectional Vision, 8 pages, Jun. 2000.

L.S. Nyland et al., "Capturing, Processing and Rendering Real-World Scenes," Videometrics and Optical Methods for 3D Shape Measurement Techniques, Electronic Imaging Photonics West, vol. 2309, 9 pages, 2001.

* cited by examiner

METHOD AND SYSTEM FOR CREATING INTERACTIVE WALKTHROUGHS OF REAL-WORLD ENVIRONMENT FROM SET OF DENSELY CAPTURED IMAGES

CROSS REFERENCE TO RELATED APPLICATIONS

This application relates to U.S. patent applications Ser. No. 10/449,929 entitled "Method and Apparatus for Computing Error-Bounded Position and Orientation of Panoramic Cameras in Real-world Environments;" Ser. No. 10/452,314 entitled "Method and Apparatus for Compressing and Decompressing Images Captured from Viewpoints Throughout N-dimensional Space;" and Ser. No. 10/452,019 entitled "Method and Apparatus for Finding Feature Correspondences Between Images Captured in Real-World Environments," all filed concurrently herewith and commonly assigned, the disclosures of which are incorporated by reference herein.

FIELD OF THE INVENTION

The present invention relates to computer simulation of real-world environments and, more particularly, to techniques for creating interactive walkthroughs or visualizations of such real-world environments from a set of densely captured images.

BACKGROUND OF THE INVENTION

Computer simulation of real-world environments is one of the major challenges of computer graphics. The ultimate goal is to capture a digital representation of a real-world environment, which later can provide observers with a realistic visual experience of interactively moving or "walking" through the environment. Thus, so-called "interactive walkthroughs" are types of computer graphics applications, where an observer moves within a virtual environment.

Applications for this technology include, but are not limited to, remote education, virtual heritage, specialist training, electronic commerce, and entertainment. For instance, students can "visit" famous historical sites they are studying in school (e.g., museums, temples, battlefields, and distant cities), archeologists can capture excavation sites as they evolve over time, soldiers and fire fighters can train in simulated environments, real estate agents can show potential buyers the interiors of homes for sale via the Internet, and people around the world can enjoy virtual travel and multi-player three-dimensional (3D) games.

The major research challenge in such applications is to develop effective techniques for capturing, representing, and rendering large environments with photorealistic imagery from arbitrary viewpoints at interactive rates.

Current computer graphics techniques fall short of meeting these challenges. Although geometry-based walkthrough systems have been demonstrated for large-scale environments, the images they produce are far from photorealistic. Alternatively, image-based rendering (IBR) systems produce photorealistic images by resampling photographs, but usually work only for small and/or diffusely illuminated environments as seen from a limited range of viewpoints. Similarly, most computer vision algorithms that extract three-dimensional models from images have difficulties with scenes containing complex occlusions and specular surfaces.

Thus, there exists a need for techniques that overcome the above-mentioned drawbacks by providing photorealistic walkthroughs of large spaces rendered from arbitrary viewpoints at interactive rates.

SUMMARY OF THE INVENTION

The present invention provides techniques for creating interactive walkthroughs or visualizations of real-world environments. Such environments for which interactive walkthroughs may be created may comprise large interior spaces (e.g., buildings), wherein a space may comprise multiple rooms. The interactive walkthroughs may be photorealistic and rendered from arbitrary viewpoints at interactive rates.

For example, in one aspect of the invention, a technique for generating a visualization of an environment comprises the following steps. A dense set of image data is captured from the environment. The captured image data is compressed for storage. A portion of the compressed image data may then be decompressed such that a visualization representative of the environment may be rendered from a selected novel viewpoint. Another portion of the image data may be prefetched and decompressed such that captured image data surrounding the selected novel viewpoint is available to render the visualization from the selected novel viewpoint. The visualization of the environment may then be rendered from the selected novel viewpoint.

The image data capturing step may further comprise navigating through the environment using an untethered camera-bearing cart, calculating camera pose from a plurality of fiducials (e.g., light sources) positioned throughout the environment, and storing captured images for immediate or subsequent processing.

The image data compressing step may further comprise creating a spatial hierarchy of images combined with a compression algorithm. Images may be compressed by building a tree via edge collapse operations of a triangulation of the image centers-of-projection and calculating residual images and reference images. The image data decompressing step may further comprise extracting images from the spatial hierarchy via a sequence of image warping and image addition operations. The image warping operation may calculate a set of features across subsets of the image data and use the features to warp reference images to centers-of-projection of residual images and then add the two images together.

The image data prefetching step may further comprise maintaining a cut (e.g., list of nodes) through the spatial hierarchy with the images above the cut being immediately available for rendering. The image data prefetching step may also comprise using viewpoint prediction to update priorities of the images and thus update the cut through the spatial hierarchy. The novel visualization rendering step may further comprise warping and combining captured images near a novel viewpoint to reconstruct a view of the environment from the same vantage point.

Thus, advantageously, the present invention may acquire a photorealistic model of a large real-world environment by sampling the space of interior viewpoints densely with panoramic (e.g., omnidirectional) images captured every few inches. From such a dense and redundant data set, the invention may use compression and working set management algorithms to reproduce specular highlights and complex visibility effects during walkthroughs of large environments over a wide range of novel viewpoints.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
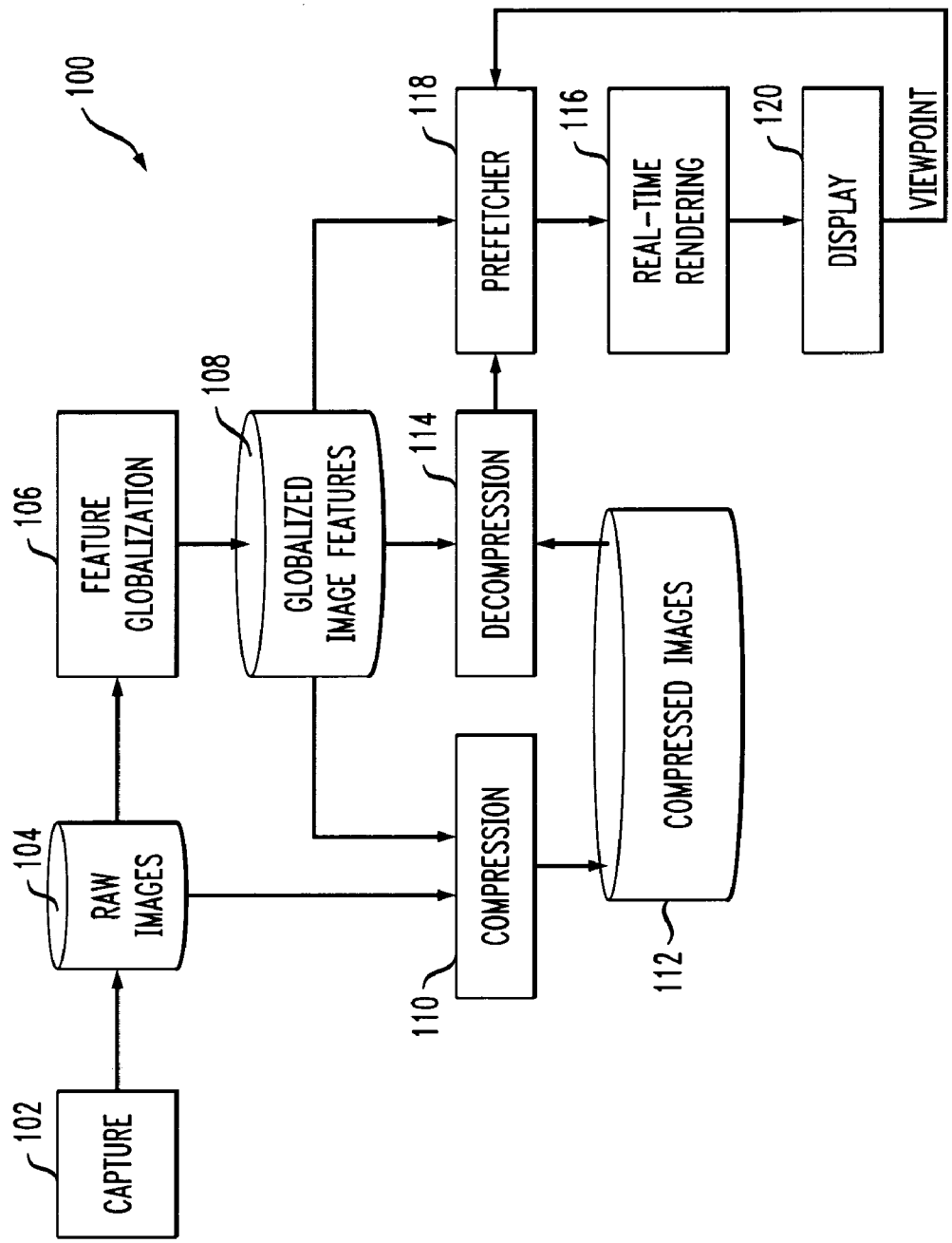
FIG. 1 is a block diagram illustrating an interactive walkthrough system, according to an embodiment of the present invention.

The following description will illustrate the invention in the context of an exemplary interactive walkthrough application. It should be understood, however, that the invention is not necessarily limited to use with any particular type of application. The invention is instead more generally applicable to any application in which it is desirable to create a digital representation of an existing environment and then render visualizations associated with the digital representation to one or more users.

As will be evident from the illustrative descriptions to follow, the invention is capable of creating interactive walkthroughs of existing 3D environments containing large spaces and, optionally, multiple rooms. As compared to existing techniques, the invention replaces the difficult problems of 3D reconstruction and surface reflectance modeling with the easier problems of motorized cart navigation, data management, and interactive rendering from a dense dataset. Rather than requiring sophisticated planning and reconstruction algorithms to directly acquire a minimal representation of the environment, the techniques of the invention acquire a highly redundant dataset and then filter and compress the dataset into a representation suitable for interactive navigation through the environment.

Although not limited thereto, the invention uses a parameterization best suited for viewpoint-centric applications, such as interactive walkthroughs and visualizations. Information is stored at locations directly associated with viewpoints as opposed to on the surface of the geometry of the environment. This provides efficient access to rendering information as the viewpoint changes slowly.

The parameterization is based on the plenoptic function. The full seven-dimensional (7D) plenoptic function was introduced by E. H. Adelson et al. in "The Plenoptic Function and the Elements of Early Vision," Computational Models of Visual Processing, MIT Press, Cambridge, Mass., 3–20, 1991, the disclosure of which is incorporated by reference herein. The 7D plenoptic function describes the light intensity as viewed according to the following dimensions: viewpoint (quantified in three dimensions); direction (two dimensions); time; and wavelength. By restricting the problem to static scenes captured at one point in time, at fixed wavelengths (e.g., red, green, and blue), the 7D plenoptic function can be reduced to five dimensions. In accordance with the invention, a four-dimensional (4D) subset of the plenoptic function is used. The 4D function is obtained by fixing the viewpoint and allowing only the viewing direction and zoom factor to change. Such a representation is parameterized by camera position (x, y) and incoming ray direction ($\phi, \theta$).

As will be further evident, examples of advantages of the invention include: (i) enablement of accurate image reconstructions for novel views in environments with specular surfaces, a great amount of geometrical detail, and complex visibility changes; (ii) no requirement of an accurate geometrical model to produce novel images over a wide range of viewpoints; (iii) provision of a method for modeling large, concave spaces without sophisticated gaze planning; and (iv) support for inside-looking-out images in an interactive walkthrough system. Further advantages will be evident from the descriptions of principles of the invention to follow.

Referring initially to FIG., 1, a block diagram illustrates an interactive walkthrough system, according to an embodiment of the present invention. As shown, interactive walkthrough system 100 comprises a capture subsystem 102, a raw image store 104, a feature globalization module 106, a globalized image feature store 108, a compression module 110, a compressed image store 112, a decompression module 114, a real-time rendering module 116, a prefetcher module 118 and a display 120.

In general, in accordance with system 100 in FIG. 1, images are captured and stored.

Then, image features are computed and stored. The observer is provided with an interface to navigate through the environment. Data management algorithms (compression and prefetching) are used to provide interactive access to the data so that novel views can be rendered in real-time. Novel views are rendered by warping and combining the captured images surrounding the novel viewpoint. Details of each functional block in FIG. 1 will now follow.

Capture

Capture subsystem 102 captures a sequence of images of a 3D environment. The captured images may be stored on a storage medium, such as raw image store 104, or may be further processed in real time. Various existing capture subsystems may be employed to obtain this collection of images. The invention is not limited to any particular capture subsystem.

In applications that are used to capture a digital representation of a site, such as a museum, it is important for the capture approach to be practical and easy to deploy because the caretakers of a site would frown upon complex installations. Furthermore, it is advantageous to use a capture subsystem that an untrained technician can easily operate.

One existing capture technique that could be employed includes use a custom gantry to capture a dense set of images uniformly over a plane, see for example, M. Levoy et al., "Light Field Rendering," Proceedings of ACM SIGGRAPH 96, pp. 31–42, 1996, and U.S. Pat. No. 6,097,394, issued Aug. 1, 2000, the disclosures of which are incorporated by reference herein. Another existing capture technique that may be employed for outdoor environments includes capturing and calibrating outdoor images spaced by several to tens of meters. The technique depends on initial measurements from a global positioning system, see for example, S. Teller et al., "Calibrated, Registered Images of an Extended Urban Area," IEEE Computer Vision and Pattern Recognition (CVPR) 2001, the disclosure of which is incorporated by reference herein.

Furthermore, large-scale (optical) trackers could be used for image capture. Also, gaze-planning algorithms can be used to plan image capture in larger spaces, however, a priori knowledge of the geometry of the environment is needed.

While the above techniques could be used and/or adapted for use, the capture subsystem and calibration techniques described in the U.S. patent application identified as Aliaga 3-14 and entitled "Method and Apparatus for Computing Error-Bounded Position and Orientation of Panoramic Cameras in Real-world Environments;" and the U.S. patent application identified as Ser. No. 10/10/156,189 filed on Jun. 29, 2002 and entitled "A Novel Camera Model and Calibration Procedure for Omnidirectional Paraboloidal Catadioptric Cameras" the disclosures of which are incorporated by reference herein, may preferably be employed so as to enable the capture of a wide range of dense viewpoints in complex interior environments of unknown geometry.

Such a capture subsystem may comprise a system for navigating a free-moving (untethered) cart, via manual or automatic navigation control, so as to capture images of the environment from a plane typically at eye-level. The cart may contain an omnidirectional camera (as described in the above-referenced Aliaga 2-13), associated computer, electric motors, and a battery for all power requirements. Preferably, the camera captures large field-of-view (FOV) images so as to permit an immersive experience where the observer can look in almost any direction. Moreover, the capture subsystem is able to simultaneously capture images to disk and navigate through the environment, so as to reduce the capture time.

Several different omnidirectional camera designs may be employed. In a preferred embodiment, a paraboloidal catadioptric camera is used, see for example, S. Nayar, "Catadioptric Omnidirectional Camera," IEEE Computer Vision and Pattern Recognition (CVPR), pp. 482–488, 1997, the disclosure of which is incorporated by reference. This camera captures a hemispherical FOV of the environment with a single center-of-projection (COP) and 1024×1024 pixel images. A FOV spanning 360 by 180 degrees in front of the mirror is reflected onto an image plane that is parallel to and lies in front of the mirror. Since the horizon is located at the mirror border, the vertical FOV spans 0 to −90 degrees. Because the camera has a single COP, simple transformations can be applied to obtain cylindrical and planar reprojections.

Calibration of the intrinsic camera parameters may be done in accordance with the calibration techniques described in the above-referenced Aliaga 2-13. The traditional method assumes that the lens projection is perfectly orthographic. However, relaxing this assumption, intrinsic parameters are obtained that are more accurate by an order of magnitude, and which are fixed for the entire capture session.

In order to facilitate capturing images in large, multi-room environments, the camera pose of each image should be determined automatically. Furthermore, the method should be quick and easy to perform.

One existing camera pose estimation technique that may be used employs structure from motion techniques to track environment features during an image sequence and obtain camera pose, as well as 3D information about the scene, see for example, R. Koch et al., "Calibration of Hand-held Camera Sequences for Plenoptic Modeling," IEEE International Conference on Computer Vision (ICCV), pp. 585–591, 1999, the disclosure of which is incorporated by reference herein. Another technique provides a system for computing pose from feature correspondences in panoramic images, see for example, C. Taylor, "VideoPlus," IEEE Workshop on Omnidirectional Vision, pp. 3–10, June 2000, the disclosure of which is incorporated by reference herein. Furthermore, several hardware trackers, for example, those made by Polhemus, Ascension, and 3rd Tech, may be employed.

While the above techniques could be used and/or adapted for use, the camera pose estimation techniques described in the U.S. patent application Ser. No. 10/449,929 filed concurrently herewith and entitled "Method and Apparatus for Computing Error-Bounded Position and Orientation of Panoramic Cameras in Real-world Environments;" the disclosure of which is incorporated by reference herein, may preferably be employed.

Such a camera pose estimation algorithm tracks fiducials in the captured images and triangulates position and orientation from the fiducial projections. To obtain high reliability and accuracy, the fiducials are small battery-powered light bulbs placed in the environment by the operator at approximately known locations. After providing the initial camera position, the pose estimation algorithm uses the current position estimate and a floor plan to determine which fiducials may be visible in the current image, tracks these from image to image, and triangulates camera position and orientation in real-time. A globally consistent set of camera poses and fiducial locations is determined using bundle adjustment (a nonlinear global optimization method) and a dense set of omnidirectional images with calibrated camera parameters on a plane at eye height is obtained.

To determine the accuracy of the camera pose estimates, an analytic error model may be used to compute a bound on pose error. Given a particular fiducial configuration in an environment, an image sequence through the environment, and tracked fiducial projections, the model computes for each image the region of the environment that may contain the camera's COP. In addition, this error model allows for a formulation of a tradeoff between fiducials and pose estimation accuracy. Consequently, this algorithm can be used to suggest fiducial locations to produce a desired pose estimation error bound.

Feature Globalization

Turning now to feature globalization module 106 in FIG. 1, a consistent set of image features (e.g., corners, edges) is identified and tracked over adjoining images, in accordance with such module. For example, these features may be used to improve compression and to improve rendering. Compression may be improved by using globalized features to establish correspondences among adjoining images in order to more effectively exploit inter-image coherence. Rendering may be improved by using these features to interpolate between captured images and create higher-quality novel views. These features may be stored in a storage medium, such as globalized image feature store 108.

Existing techniques for exploiting inter-image coherence may be employed. However, the invention is not intended to be limited to any particular inter-image coherence exploitation techniques. Also, it is to be understood that inter-image coherence exploitation techniques, while preferred, are optional in the interactive walkthrough system of the invention.

There are several possible approaches that can be used to exploit inter-image coherence. A simple approach is to interpolate images without any warping, see for example, the above-referenced Levoy et al. (1996). A second approach employs image warping by re-projecting image samples according to depths derived from an approximate 3D model (or proxy). A third approach is to estimate the depth value or pixel correspondence for every pixel in every image. The depth values for the third approach may be obtained using laser-scanning devices, see for example, L. Nyland et al., "Capturing, Processing, and Rendering Real-World Scenes," Videometrics and Optical Methods for 3D Shape Measurement Techniques, Electronic Imaging Photonics West, vol. 2309, 2001, the disclosure of which is incorporated by reference herein. Another approach is to find and use correspondences between a relatively small set of distinctive image features (e.g., corners) and to define a warp based on their correspondences. For example, the above-referenced Koch et al. (1999) detects features in images of a video sequence and tracks them to earlier or later images while relabeling the ones that correspond.

While the above techniques could be used and/or adapted for use, the feature globalization techniques described in the U.S. patent application Ser. No. 10/452,019 filed concurrently herewith and entitled "Method and Apparatus for Finding Feature Correspondences Between Images Captured in Real-world Environments," the disclosure of which is incorporated by reference herein, may preferably be employed. Feature globalization aims to produce better feature correspondences so as to improve compression and rendering quality. The algorithm works with or without approximate geometry information. Moreover, the algorithm can work on commonly available PCs and graphics hardware.

The feature globalization approach exploits the redundancy within a dense image dataset (captured in accordance with capture subsystem 102) to establish feature correspondences over a wide region of viewpoints and creates a globally consistent set of image features. The features are then used to warp images for creating novel views of the environment or for compression.

First, features are detected in a subset of the reference images and propagated to other images within a local region. Second, features that track to approximately the same location in the same image and satisfy similarity criteria are flagged as a potential correspondence. Third, unlike establishing correspondences along a traditional video sequence, a greedy graph-labeling algorithm is used to select feature correspondences and provide a consistent labeling in best-first order. This technique finds feature correspondences across a wide range of viewpoints in difficult scenes (e.g., with occlusions) where many features would be lost by a typical feature tracker. Moreover, this technique produces high-quality novel images in a walkthrough system, even when reference images are separated by large distances and/or have poor camera pose estimates.

A key feature of this feature globalization technique is that two features are considered for correspondence if they track to the same location in any destination image via any of the multiple viewpoint paths. For example, consider trying to find the correspondences for two scene features, X and Y, between two images, A and B, captured from opposite ends of a room. Due to occlusion of an obstacle in the middle of the room, it might be difficult to track both features along any single path of viewpoints between images A and B. The feature globalization technique finds the correspondence for both X and Y because it matches features if they track to the same location in any image. This redundancy allows the algorithm to find potential feature correspondences more robustly and across a wider range of viewpoints than traditional feature tracking methods.

Figure 2:
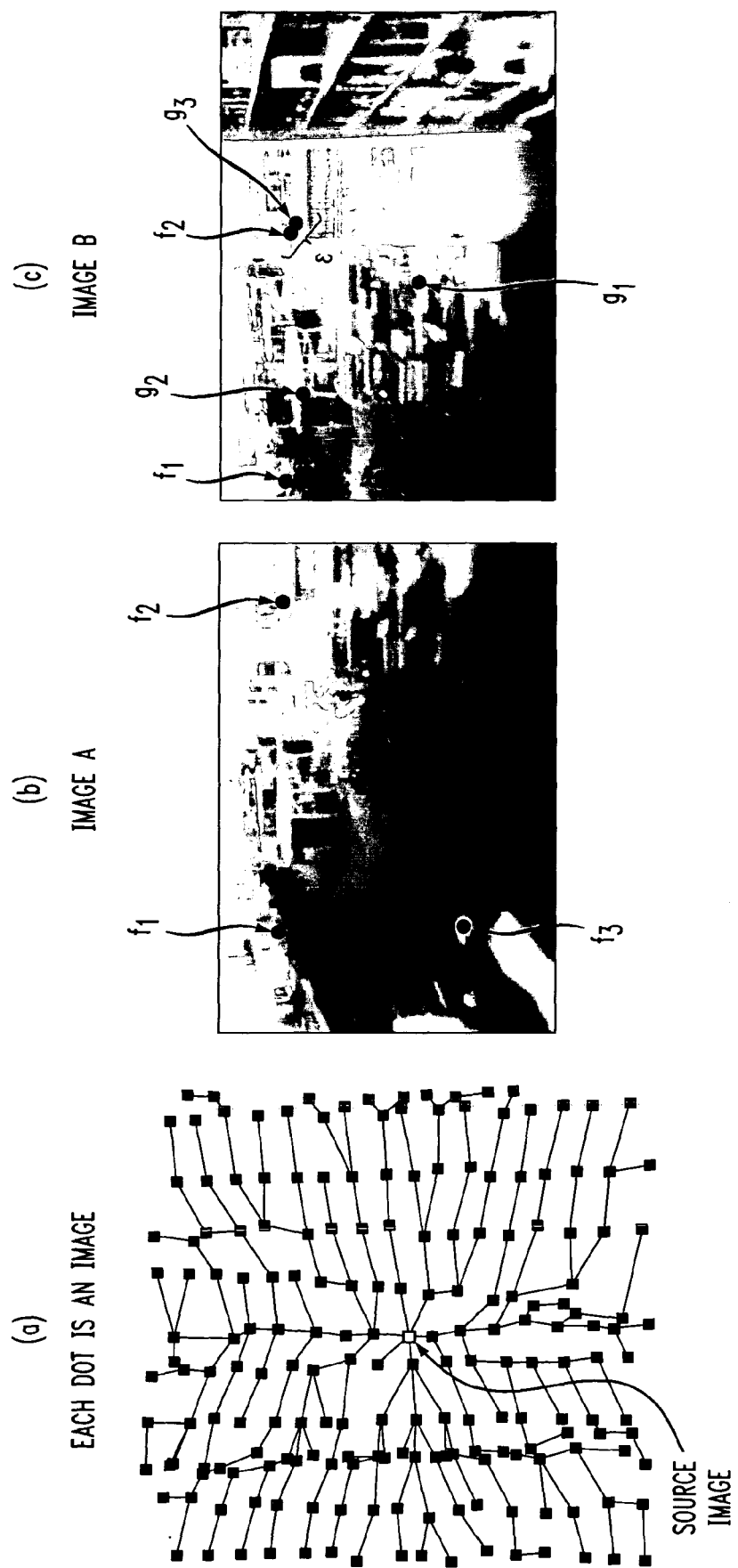
FIGS. 2A through 2C are diagrams illustrating a process for exploiting inter-image coherence, according to an embodiment of the present invention.

FIGS. 2A through 2C are diagrams illustrating a process for exploiting inter-image coherence, according to an embodiment of the present invention. More particularly, FIGS. 2A through 2C illustratively depict the feature globalization technique. In accordance with FIG. 2A, using the edges of a 2D triangulation of the image viewpoints, the technique tracks outwards from each source image along non-intersecting paths. In accordance with FIG. 2B, for a source image A, the technique detects features, such as $f_1$, $f_2$ and $f_3$, and adds them to the untracked list of features for that image. In accordance with FIG. 2C, the technique then iteratively tracks all untracked features to the next neighboring image B along each non-intersecting path. If a successfully tracked feature (such as $f_1$ or $f_2$) is within $\epsilon$ of an existing feature in an image B from another source image and satisfies similarity criteria, the pair $(f_i, g_i)$ is potentially corresponding.

Data Management

Compression module 110 and decompression module 114, along with prefetcher module 118, in FIG. 1 will now be described. It is to be appreciated that the compression and prefetching operations are referred to collectively herein as data management operations.

Such data management operations are desired due to the size of the captured data sets. For example, a captured data set may contain thousands of images or more and require gigabytes of storage or more. To support effective interactive walkthroughs, data management should allow extraction of images along arbitrary contiguous paths through the environment, i.e., no restriction that images be accessed in the same order they were captured. Further, data management should ensure that images near the novel viewpoint are always available for image warping.

A preferred approach to data management is to take advantage of the redundancy in the data for compression while simultaneously optimizing the data layout for cache coherence in a walkthrough system. Currently, disk storage is relatively abundant but bandwidth from disk into memory is limiting on most computer architectures. Hence, in a walkthrough application, the compression strategy should focus on reducing the amount of data required for incremental decompression of nearby images rather than on reducing the size of the total database stored on disk.

While existing compression schemes may be used or adapted for use (e.g., JPEG, MPEG), a preferred embodiment utilizes the compression techniques described in the U.S. patent application Ser. No. 10/452,314 filed concurrently herewith and entitled "Method and Apparatus for Compressing and Decompressing Images Captured from Viewpoints Throughout N-dimensional Space;" the disclosure of which is incorporated by reference herein. This embodiment creates a data structure that combines a multi-resolution spatial image hierarchy with a compression algorithm in order to provide quick access to images during interactive walkthroughs and enable efficient compression of high-resolution images irregularly sampled over a plane. The spatial image hierarchy organizes images in an efficient manner so that images near a (moving) novel viewpoint can be efficiently accessed. Compression is achieved by storing compressed reference images and compressed residual images in the hierarchy. Moreover, unlike Motion Picture Experts Group (MPEG) compression, the technique preferably used herein takes advantage of the inter-image redundancy over the entire capture plane, and eliminates the need for costly motion-estimation. The resulting hierarchy and compressed image data may be stored on a storage medium, such as compressed image store 112. Portions of the compressed data are later decompressed via decompression module 114 before rendering.

By way of example, such compression technique may serve to compress approximately 10,000 images of 1024× 1024 pixels of a real-world environment irregularly sampled over a plane providing high compression performance, scalability, and interactive image access along arbitrary viewpoint paths.

Figure 3:
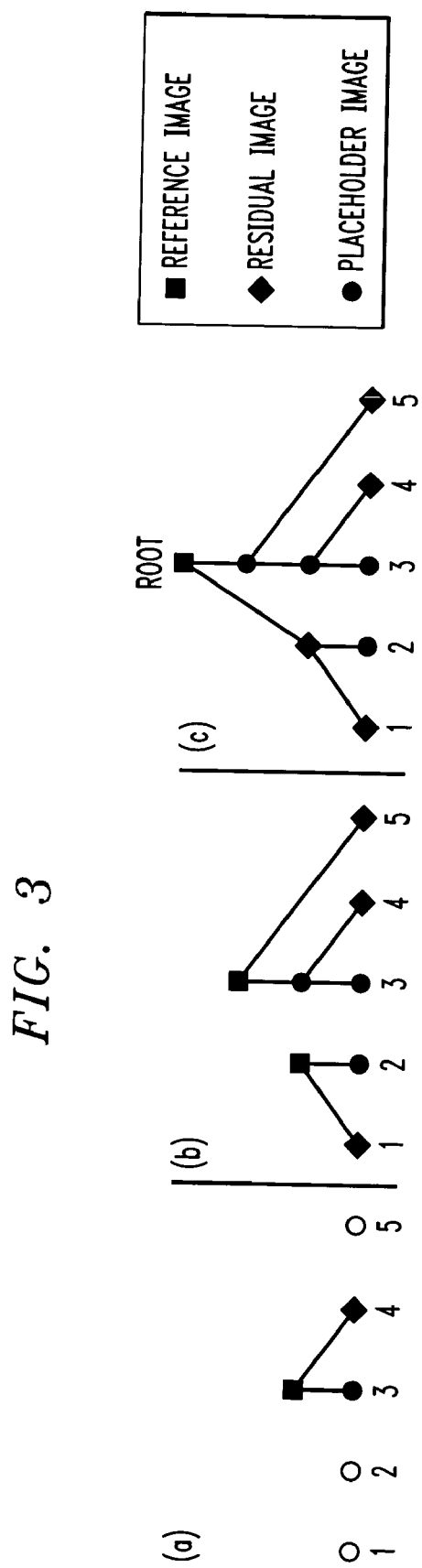
FIGS. 3A through 3C are diagrams further illustrating a compression process, according to an embodiment of the present invention.

The compression algorithm arranges and compresses reference images and residual images into a multiresolution hierarchy. This is illustrated in FIGS. 3A through 3C. The tree is built bottom up using half edge-collapse operations. First, the algorithm creates a set of nodes representing each captured image at its viewpoint (FIG. 3A). Then, using a triangulation of the nodes, the next highest priority edge is collapsed, the nodes of the edge endpoints are replaced with a new common parent node (FIG. 3B), and the process is repeated for the remaining edges (FIG. 3C).

Figure 4:
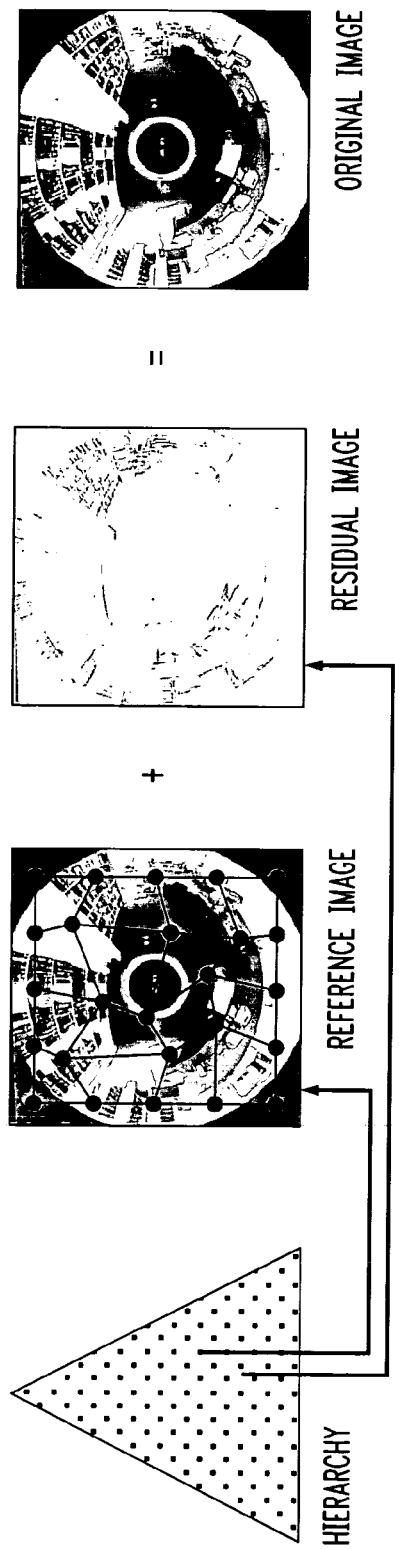
FIG. 4 is a diagram illustrating an image hierarchy and a extraction process, according to an embodiment of the present invention.

FIG. 4 illustrates the process for extracting a reconstructed original image from the hierarchy, according to an embodiment of the present invention. Reconstructed original images are extracted from the hierarchy via a sequence of image warping operations. Each operation warps a reference image to the center-of-projection of the corresponding residual image and adds the two together. The warping process may utilize a proxy, which is an approximate 3D model of the environment, image features that are globally consistent, or another method. A consistent set of image features can by identified and tracked using the techniques previously described and also in the U.S. patent application Ser. No. 10/452,019 filed concurrently herewith and "Method and Apparatus for Finding Feature Correspondences Between Images Captured in Real-world Environments," the disclosure of which is incorporated by reference herein.

There are several ways to build the hierarchy, each of which yields a different tradeoff between compression, quality, and time. One particular set of tradeoffs that have been experimented with is to use an inverse Euclidean image distance as the edge collapse priority, reference images distributed throughout the tree (e.g., every five levels in the tree), predicted images directly relative to the closest ancestor reference image, and an optimal set of translation and rotation offsets computed to better register the proxy to each pair of images and reduce the energy of the residual image. While prediction directly relative to a reference image instead of another residual image may not give optimal compression, it improves the working set size and decompression time.

Turning now to the prefetching algorithm, such algorithm should guarantee that a set of captured images surrounding the viewpoint is always loaded in cache. If the moving observer outpaces the prefetching algorithm, the prefetcher should support a graceful degradation of reconstruction quality by providing the runtime algorithm with a sparse set of images and eventually catching up to the observer's moving viewpoint.

Several systems have been deployed for interactive rendering of large environments. Some approaches are geared towards synthetic models and use geometric simplification and visibility culling to obtain real-time rates. Another group of systems, specialized for outdoor models, uses image-based methods for rendering acceleration. A challenge is to build an interactive rendering system supporting quick access to an out-of-core dataset. But, unlike previous systems, a huge collection of images irregularly distributed over a plane must be organized and loaded from disk in real-time.

Accordingly, a preferred approach is to maintain a "cut" through the multiresolution spatial hierarchy. This cut guarantees that at any location within the walkable space, there is always a set of surrounding images. Prefetching uses an asynchronous process to maintain a cache of images in main memory. The user's movement history can be used to predict which images are needed next. Thus, prefetcher maintains two linked lists of tree nodes. The evict list defines a cut through the tree such that all nodes on and above this cut are in cache. The fetch list consists of all the immediate children of the evict list nodes that are candidates for being loaded from disk. The algorithm uses the observer's latest viewpoint and predicted velocity to compute for all nodes in the evict list and fetch list the probability that its image is needed next. The prefetcher continuously uses the probabilities to swap nodes between the two lists. At run-time, the current cut is used to determine which images to use for reconstructing the current view.

A main feature of this approach is that it provides a multiresolution way of loading images into the cache with graceful degradation and adaptive refinement. Even if it is not possible for the system to load images from disk into the cache at video frame rates, the multiresolution prefetching strategy ensures that nearby images, corresponding to viewpoints at higher levels of the hierarchy, are available.

Thus, in terms of FIG. 1, since the image and feature data is typically larger then online memory, a prefetching algorithm, such as described above, is used by prefetcher module 118 to asynchronously load data into a cache. The cache may be part of the real-time rendering module 116. The prefetcher uses the current viewpoint to predict future viewpoints and to prioritize what data should be loaded from disk. The data from the cache is rendered (a visual presentation is formed) by rendering module 116 and displayed on a display medium such as display 120.

Hardware Architecture

Figure 5:
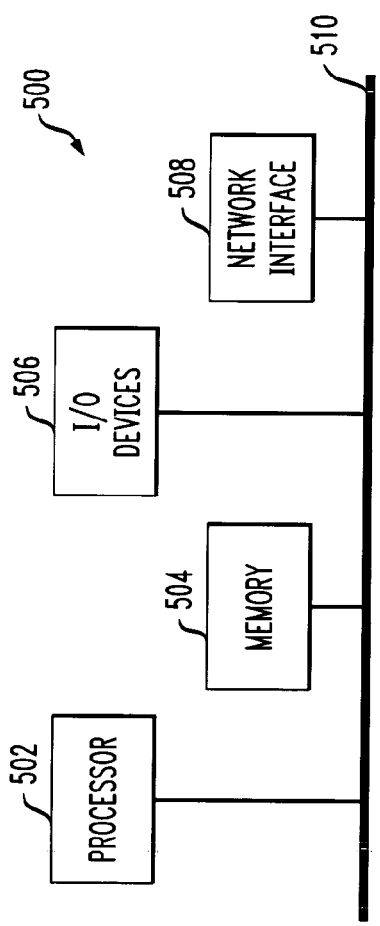
FIG. 5 is a block diagram illustrating a generalized hardware architecture of a computer system suitable for implementing one or more functional components of an interactive walkthrough system, according to an embodiment of the present invention.

Referring finally to FIG. 5, a block diagram illustrates a generalized hardware architecture of a computer system suitable for implementing one or more of the functional components of the interactive walkthrough system as depicted in the figures and explained in detail herein. It is to be understood that the individual components of the interactive walkthrough system, e.g., as illustrated in FIG. 1, may be implemented on one such computer system, or more preferably, on more than one such computer system. In the case of an implementation on a distributed computing system, the individual computer systems and/or devices may be connected via a suitable network, e.g., the Internet or World Wide Web. However, the system may be realized via private or local networks. The interactive walkthrough system is not limited to any particular network. Also, the components of the system may be implemented in a client/server architecture, e.g., rendering and display operations are implemented on one or more client devices, while capture, feature globalization, compression and prefetching operations are implemented on one or more servers. It is to be understood that alternate partitioning of functionality may be implemented. Thus, the computer system depicted in FIG. 5 represents a client device or a server. Also, as mentioned above, the capture subsystem may have its own computer system.

As shown, the computer system 500 may be implemented in accordance with a processor 502, a memory 504, I/O devices 506, and a network interface 508, coupled via a computer bus 510 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. The memory 504 includes the memory capacity for implementing the data stores in FIG. 1.

In addition, the phrase "input/output devices" or "I/O devices" as used herein is intended to include, for example, one or more input devices (e.g., cameras, keyboards, etc.) for entering data to the processing unit, and/or one or more output devices (e.g., speaker, display, etc.) for presenting results associated with the processing unit.

Still further, the phrase "network interface" as used herein is intended to include, for example, one or more transceivers to permit the computer system to communicate with another computer system via an appropriate communications protocol.

Accordingly, software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

We claim:

1. A method of generating at least one visualization representative of a real-world environment, comprising the steps of:
   capturing a dense set of image data from the real-world environment;
   compressing the captured image data for storage, wherein the image data compressing step further comprises creating a spatial hierarchy;
   decompressing a portion of the compressed image data such that a visualization representative of the real-world environment may be rendered from a selected novel viewpoint;
   prefetching and decompressing another portion of the image data such that captured image data surrounding the selected novel viewpoint is available to render the visualization from the selected novel viewpoint; and
   rendering the visualization of the real-world environment from the selected novel viewpoint;
   wherein the image data compressing step further comprises compressing images by building a tree via edge collapse operations of a triangulation of the image centers-of-projection and calculating residual images and reference images.

2. The method of claim 1, wherein the image data capturing step further comprises navigating through the real-world environment using an untethered camera-bearing cart.

3. The method of claim 1, wherein the image data capturing step further comprises calculating camera pose from a plurality of fiducials positioned throughout the real-world environment.

4. The method of claim 1, wherein the image data capturing step further comprises storing captured images for immediate or subsequent processing.

5. The method of claim 1, wherein the image data decompressing step further comprises extracting images from the spatial hierarchy via a sequence of image warping and image addition operations.

6. The method of claim 5, wherein the image warping operation calculates a set of features across subsets of the image data and uses the features to warp reference images to centers-of-projection of residual images and then add the two images together.

7. The method of claim 1, wherein the image data prefetching step further comprises maintaining a cut through the spatial hierarchy with the images above the cut being immediately available for rendering.

8. The method of claim 7, wherein the image data prefetching step further comprises using viewpoint prediction to update priorities of the images and thus update the cut through the spatial hierarchy.

9. The method of claim 1, wherein the novel visualization rendering step further comprises warping and combining captured images near a novel viewpoint to reconstruct a view of the real-world environment from the same vantage point.

10. Apparatus for generating at least one visualization representative of an real-world environment, the apparatus comprising:
    a memory; and
    one or more processors coupled to the memory and operative to: (i) obtain a dense set of image data captured from the real-world environment; (ii) compress the captured image data for storage, wherein the image data compressing operation further comprises creating a spatial hierarchy; (iii) decompress a portion of the compressed image data such that a visualization representative of the real-world environment may be rendered from a selected novel viewpoint; (iv) prefetch and decompress another portion of the image data such that captured image data surrounding the selected novel viewpoint is available to render the visualization from the selected novel viewpoint; and (v) render the visualization of the real-world environment from the selected novel viewpoint;
    wherein the image data compressing operation further comprises compressing images by building a tree via edge collapse operations of a triangulation of the image centers-of-projection and calculating residual images and reference images.

11. The apparatus of claim 10, wherein the image data is captured by navigating an untethered camera-bearing cart through the real-world environment.

12. The apparatus of claim 10, wherein the at least one processor is further operative to calculate camera pose from a plurality of fiducials positioned throughout the real-world environment.

13. The apparatus of claim 10, wherein the memory is operative to store captured images for immediate or subsequent processing.

14. The apparatus of claim 10, wherein the image data decompressing operation further comprises extracting images from the spatial hierarchy via a sequence of image warping and image addition operations.

15. The apparatus of claim 14, wherein the image warping operation calculates a set of features across subsets of the image data and uses the features to warp reference images to centers-of-projection of residual images and then add the two images together.

16. The apparatus of claim 10, wherein the image data prefetching operation further comprises maintaining a cut through the spatial hierarchy with the images above the cut being immediately available for rendering.

17. The apparatus of claim 16, wherein the image data prefetching operation further comprises using viewpoint prediction to update priorities of the images and thus update the cut through the spatial hierarchy.

18. The apparatus of claim 10, wherein the novel visualization rendering operation further comprises warping and combining captured images near a novel viewpoint to reconstruct a view of the real-world environment from the same vantage point.

* * * * *